(12) United States Patent
Okushita et al.

(10) Patent No.: US 6,864,348 B2
(45) Date of Patent: Mar. 8, 2005

(54) POLYETHERPOLYAMIDE ELASTOMER HAVING LOW WATER ABSORPTION

(75) Inventors: Hiroshi Okushita, Yamaguchi (JP); Tadao Muramatsu, Yamaguchi (JP); Teruaki Fujii, Yamaguchi (JP)

(73) Assignee: UBE Industries, Ltd. (JP)

( * ) Notice: Subject to any disclaimer, the term of this patent is extended or adjusted under 35 U.S.C. 154(b) by 0 days.

(21) Appl. No.: 10/304,708

(22) Filed: Nov. 27, 2002

(65) Prior Publication Data

US 2003/0144462 A1 Jul. 31, 2003

(30) Foreign Application Priority Data

Nov. 27, 2001 (JP) ........................................ 2001-360876
Jul. 23, 2002 (JP) ........................................ 2002-213693

(51) Int. Cl.$^7$ ........................ C08G 69/08; C08G 69/40
(52) U.S. Cl. ...................... 528/310; 528/170; 528/176; 528/183; 528/189; 528/322; 528/329.1; 528/332; 528/335; 525/420; 525/432; 428/411.1; 428/474.4; 428/477.4
(58) Field of Search ................... 528/310, 170, 528/176, 183, 189, 322, 329.1, 332, 335, 295.3, 324–325; 525/420, 432, 408, 425, 420.5, 434; 428/411.1, 474.4, 477.4

(56) References Cited

U.S. PATENT DOCUMENTS

| 5,030,710 | A | * | 7/1991 | Speranza et al. | ............ 528/324 |
| 5,051,491 | A | | 9/1991 | Pipper et al. | |
| 5,053,484 | A | * | 10/1991 | Speranza et al. | ............ 528/338 |
| 5,086,162 | A | * | 2/1992 | Speranza et al. | ............ 528/339 |
| 5,140,065 | A | * | 8/1992 | Dalla Torre et al. | ........... 525/66 |
| 5,331,061 | A | * | 7/1994 | Liedloff | ...................... 525/425 |
| 5,502,095 | A | * | 3/1996 | Ueshima et al. | ............ 524/269 |
| 5,574,128 | A | * | 11/1996 | Judas et al. | ................. 528/288 |
| 5,900,471 | A | * | 5/1999 | Glans | ......................... 528/170 |
| 6,297,345 | B1 | * | 10/2001 | Okushita et al. | ............ 528/170 |
| 6,767,988 | B2 | * | 7/2004 | Okushita et al. | ............ 528/310 |

FOREIGN PATENT DOCUMENTS

EP 0 483 954 A1 5/1992
EP 0 761 715 A1 3/1997

OTHER PUBLICATIONS

European Search Report of Mar. 14, 2003.
"XTJ–502 Poly(oxyethylene)diamine (CAS 65605–36–9)", Technical Bulletin, Huntsman Corp., 1996, pp. 1–2.

* cited by examiner

*Primary Examiner*—P. Hampton Hightower
(74) *Attorney, Agent, or Firm*—Nixon Peabody LLP; Jeffrey L. Costellia

(57) ABSTRACT

Polyetherpolyamide elastomer showing a low water absorption, a high stress relaxation, and a high elastic recovery percentage of elongation is obtainable by polymerizing an aminocarboxylic acid compound and/or a lactam compound, a triblock polyetherdiamine compound having the following formula, and a dicarboxylic acid compound:

$$H_2N\!-\!\!\left(\!CHCH_2O\!\right)_{\!\!x}\!\!\left(\!CH_2CH_2CH_2CH_2\!-\!O\!\right)_{\!\!y}\!\!\left(\!CH_2CHO\!\right)_{\!\!z}\!\!CH_2CH\!-\!NH_2$$
with $CH_3$ groups on the indicated carbons

[x is a value of 1 to 20, y is a value of 4 to 50, z is a value of 1 to 20].

12 Claims, No Drawings

POLYETHERPOLYAMIDE ELASTOMER HAVING LOW WATER ABSORPTION

FIELD OF THE INVENTION

The present invention relates to polyetherpolyamide elastomer having a low water absorption and good physical properties such as a high stress relaxation and a high elastic recovery percentage of elongation.

BACKGROUND OF THE INVENTION

Polyetherpolyamide elastomer comprising a hard polyamide segment, a soft polyether segment, and a polymer chain-extending dicarboxylic segment has been known.

Japanese Patent Provisional Publications No. 9-118750 and No. 2000-7780 describe polyetherpolyamide elastomer comprising a polyamide segment, a (poly)ethylene oxide segment, and a dicarboxylic segment.

Japanese Patent No. 3,199,797 describes a polyetherpolyamide elastomer comprising a polyamide segment, a polybutylene oxide segment, and a dicarboxylic segment.

According to the studies of the present inventors, the former polyetherpolyamide elastomer comprising a polyamide segment, a (poly)ethylene oxide segment, and a dicarboxylic segment shows a high water absorption, while the latter polyetherpolyamide elastomer comprising a polyamide segment, a polybutylene oxide segment, and a dicarboxylic segment is not satisfactorily high in its stress relaxation and elastic recovery percentage of elongation. The high water absorption of the elastomer is disadvantageous where the elastomer is employed for the production of articles to be used outside or under humid conditions. The relatively low stress relaxation and elastic recovery percentage of elongation is disadvantageous particularly when the elastomer is employed for the production of articles which are repeatedly bent or subjected to stress in their uses.

SUMMARY OF THE INVENTION

Accordingly, it is an object of the present invention to provide a polyetherpolyamide elastomer having a low water absorption, a high stress relaxation, and a high elastic recovery percentage of elongation, in addition to various satisfactorily high physical properties. The high stress relaxation and high elastic recovery percentage of elongation are evaluated on the basis of the same Shore hardness level (D scale).

The present invention resides in polyetherpolyamide elastomer obtainable by polymerization of a polyamide-forming compound selected from the group consisting of an aminocarboxylic acid compound having the following formula (A1) and a lactam compound having the following formula (A2), a triblock polyetherdiamine compound having the following formula (B), and a dicarboxylic acid compound having the following formula (C):

$$H_2N-R^1-COOH \tag{A1}$$

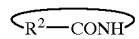
(A2)

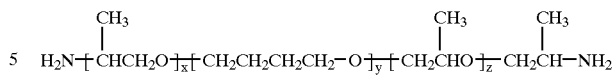
(B)

$$HOOC-(R^3)_m-COOH \tag{C}$$

in which each of $R^1$, $R^2$, and $R^3$ independently represents a linking group having a hydrocarbon chain therein, x is a value in the range of 1 to 20, y is a value in the range of 4 to 50, z is a value in the range of 1 to 20, and m is 0 or 1.

The invention further resides in a composite structure comprising a sheet of the above-identified polyetherpolyamide elastomer of the invention and a polyurethane sheet bonded to the elastomer sheet.

DETAILED DESCRIPTION OF INVENTION

Preferred embodiments of the invention are described below:

(1) The polyetherpolyamide elastomer, wherein the polyamide-forming compound [namely, compound (A1) and/or compound (A2)] is employed in an amount of 10 to 95 wt. %, preferably 15 to 90 wt. %, more preferably 15 to 85 wt. %, most preferably 15 to 80 wt. %, based on total amount of the compounds (A1), (A2), (B), and (C).

(2) The polyetherpolyamide elastomer, wherein the polymerization is performed using 15 to 70 weight parts (more preferably 20 to 70 weight parts, more preferably 20 to 65 weight parts, most preferably 25 to 65 weight parts) of the polyamide-forming compounds (A1) and/or (A2) and 30 to 85 weight parts (more preferably 30 to 80 weight parts, more preferably 35 to 80 weight parts, most preferably 35 to 75 weight parts) of a combination of the compound (B) and the compound (C) under the condition that the compounds (A1), (A2), (B), and (C) are used in an amount of 100 weight parts in total.

(3) The polyetherpolyamide elastomer, wherein the triblock polyetherdiamine compound is employed in an amount of 3 to 88 wt. %, more preferably 8 to 79 wt. %, based on the total amounts of the compounds involved for the formation of the elastomer.

(4) The polyetherpolyamide elastomer, wherein $R^1$ of the formula (A1) comprises an alkylene group having 2 to 20 carbon atoms.

(5) The polyetherpolyamide elastomer, wherein $R^2$ of the formula (A2) comprises an alkylene group having 3 to 20 carbon atoms.

(6) The polyetherpolyamide elastomer, wherein x of the formula (B) is a value in the range of 2 to 6, y is a value in the range of 6 to 12, z is a value in the range of 1 to 5.

(7) The polyetherpolyamide elastomer, wherein x of the formula (B) is a value in the range of 2 to 10, y is a value in the range of 13 to 28, z is a value in the range of 1 to 9.

(8) The polyetherpolyamide elastomer, wherein the dicarboxylic acid compound of the formula (C) is an aliphatic dicarboxylic acid or an alicyclic dicarboxylic acid.

(9) The polyetherpolyamide elastomer, wherein $R^3$ of the formula (C) comprises an alkylene group having 1 to 20 carbon atoms.

(10) The composite structure of the invention, in which the polyurethane sheet is a thermoplastic polyurethane sheet.

(11) The composite structure, in which the thermoplastic polyurethane comprises as a soft segment polyesterdiol and/or polyetherdiol.

(12) The polyetherpolyamide elastomer, wherein its Shore hardness (D scale) is in the range of 15 to 70, preferably 18 to 70, more preferably 20 to 70, most preferably 25 to 70, and a relationship between the Shore hardness (D scale) and the elastic recovery percentage of elongation satisfies the following condition:

$$Y > -0.0042X^2 + 0.175X + Z$$

[X: Shore hardness (D scale), Y: elastic recovery percentage (%) of elongation, Z: 91.5, preferably 92, more preferably 92.5, most preferably 93].

(13) The polyetherpolyamide elastomer, whose relative viscosity is in the range of 1.2 to 3.5 (0.5 wt./vol. %, m-cresol solution, at 25° C.).

(14) The polyetherpolyamide elastomer, whose water absorption is not more than 3 wt. %, preferably not more than 2.7 wt. %, more preferably not more than 2.5 wt. %.

(15) The polyetherpolyamide elastomer, whose haze is not higher than 35, preferably not higher than 34, more preferably not higher than 32, most preferably not higher than 30.

(16) The polyetherpolyamide elastomer, whose stress relaxation ($t_{0.9}$) is not less than 2 seconds, preferably is not less than 2.2 seconds, more preferably not less than 2.5 seconds, most preferably not less than 2.8 seconds.

(17) The polyetherpolyamide elastomer, whose elastic recovery percentage of elongation is in the range of 86 to 100%, preferably 87 to 100%, more preferably 88 to 100%.

(18) The polyetherpolyamide elastomer, whose modulus of elasticity is in the range of 20 to 450 MPa, preferably 20 to 400 MPa, more preferably 20 to 350 MPa, most preferably 20 to 300 MPa.

(19) The polyetherpolyamide elastomer, whose tensile strength at yield point is in the range of 3 to 25 MPa, preferably 3 to 22 MPa, more preferably 3 to 20 MPa, most preferably 3 to 18 MPa.

(20) The polyetherpolyamide elastomer, whose breaking extension is not less than 600%.

The polyetherpolyamide elastomer of the invention can be prepared by the process described below.

The polyetherpolyamide elastomer of the invention can be prepared by polymerizing a polyamide-forming compound such as an aminocarboxylic acid compound and a lactam compound, a specific triblock polyetherdiamine compound, and a dicarboxylic acid compound.

The aminocarboxylic acid compounds and/or lactam compounds can be aliphatic, alicyclic or aromatic, and their examples include ω-aminocarboxylic acids, lactam compounds, compounds prepared from diamine and dicarboxylic acid, and their salts. The diamine can be an aliphatic diamine, an alicyclic diamine, an aromatic diamine, or one of their derivatives. The dicarboxylic acid can be an aliphatic dicarboxylic acid, an alicyclic dicarboxylic acid, an aromatic dicarboxylic acid, or one of their derivatives. Preferred is a polyamide-forming compound prepared from an aliphatic diamine and an aliphatic dicarboxylic acid.

Examples of the diamine compounds include aliphatic diamine compounds having 2 to 20 carbon atoms such as ethylene diamine, triethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylenediamine, and 3-methylpentamethylene diamine.

Examples of the dicarboxylic acid compounds include aliphatic dicarboxylic acid compounds having 2 to 20 carbon atoms such as oxalic acid, succinic acid, glutaric acid, adipic acid, pimelic acid, suberic acid, azelaic acid, sebacic acid, and dodeca diacid.

Examples of the lactam compounds include aliphatic lactam compounds having 5 to 20 carbon atoms such as ε-caprolactame, ω-enantolactame, ω-undecalactam, ω-dodecalactame, and 2-pyrrolidone. Examples of the ω-aminocarboxylic acids include aliphatic ω-aminocarboxylic acids having 5 to 20 carbon atoms such as 6-aminocaproic acid, 7-aminoheptanoic acid, 8-aminooctanoic acid, 10-aminocapric acid, 11-aminoundecanoic acid, and 12-aminododecanoic acid.

The triblock polyetherdiamine compound employed in the invention is preferably represented by the following formula (B):

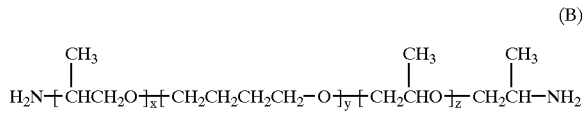

(B)

In the formula (B), x is a value in the range of 1 to 20, preferably 1 to 18, more preferably 1 to 16, more preferably 1 to 14, most preferably 1 to 12; y is a value in the range of 4 to 50, preferably 5 to 45, more preferably 6 to 40, more preferably 7 to 35, most preferably 8 to 30; and z is a value in the range of 1 to 20, preferably 1 to 18, more preferably 1 to 16, more preferably 1 to 14, most preferably 1 to 12.

If a polyetherpolyamide elastomer having a high transparency is required, x preferably is 2 to 6, more preferably 2 to 5, more preferably 2 to 4, most preferably 3 to 4; y preferably is 6 to 12, more preferably 7 to 11, more preferably 8 to 10, most preferably 8 or 9; and z preferably is 1 to 5, more preferably 1 to 4, most preferably 2 or 3.

If a polyetherpolyamide elastomer having a particularly high stress relaxation is required, x preferably is 2 to 10, more preferably 2 to 8, more preferably 2 to 7, most preferably 2 to 6; y preferably is 13 to 28, more preferably 13 to 25, more preferably 13 to 23, most preferably 13 to 21; and z preferably is 1 to 9, more preferably 1 to 7, most preferably 1 to 5.

The triblock polyetherdiamine compound employed in the invention can be identified an XYX-triblock polyetherdiamine compound. Preferred examples of the XYX-triblock polyetherdiamine compounds include XTJ-533 (commercially available from HUNTSMAN Corp., USA: a compound of the formula (B) in which x is approx. 12, y is approx. 11, and z is approx. 11), XTJ-536 (commercially available from HUNTSMAN Corp.: a compound of the formula (B) in which x is approx. 8.5, y is approx. 17, and z is approx. 7.5), and XTJ-542 (commercially available from HUNTSMAN Corp.: a compound of the formula (B) in which x is approx. 3, y is approx. 9, and z is approx. 2).

Also preferred are an XYX-triblock polyetherdiamine compound having the formula (B) in which x is approx. 3, y is approx. 14, and z is approx. 2, which is named XYX-1); an XYX-triblock polyetherdiamine compound having the formula (B) in which x is approx. 5, y is approx. 14, and z is approx. 4, which is named XYX-2), and an XYX-triblock polyetherdiamine compound having the formula (B) in which x is approx. 3, y is approx. 19, and z is approx. 2, which is named XYX-3).

Examples of the dicarboxylic acid compounds are those described hereinbefore for the aminocarboxylic acid compound and/or lactam compound. In addition, dimer acids (i.e., dimerized aliphatic dicarboxylic acids having 14 to 48 carbon atoms which can be produced by dimerization of unsaturated fatty acids obtainable by fractional distillation of triglycerides) and their hydrogenated products (i.e., hydrogenated dimer acids); alicyclic dicarboxylic acids such as 1,4-cyclohexanedicarboxylic acid and aromatic dicarboxylic acids such as terephthalic acid and isophthalic acids can be employed. Examples of the commercially available dimer acids and hydrogenated dimer acids include Pripol 1004, Pripol 1006, Pripol 1009, and Pripol 1013.

The polyetherpolyamide elastomer of the invention can be produced by fusing a mixture of the polyamide-forming compound, the triblock polyetherdiamine compound, and a dicarboxylic acid at an atmospheric pressure or increased pressure to cause polymerization, and if desired, further fusing the mixture under reduced pressure to continue the polymerization. Otherwise, the polyetherpolyamide elastomer can be produced by fusing first a mixture of the polyamide-forming compound and a dicarboxylic acid at an atmospheric pressure or increased pressure to give an oligomer and subsequently fusing a mixture of the oligomer and the triblock polyetherdiamine compound to cause polymerization, and it desired, further fusing the mixture under reduced pressure to continue the polymerization.

The polymerization can be carried out preferably at a temperature of 150 to 300° C., more preferably 160 to 280° C., most preferably 180 to 250° C.

In the case that the polyamide-forming compound is an ω-aminocarboxylic acid, the polymerization can be preferably carried out at an atmospheric pressure or at a combination of an atmospheric pressure and a reduced pressure.

In the case that the polyamide-forming compound is a lactam or a compound produced by diamine and dicarboxylic acid (or its salt), the polymerization can be preferably carried out at an increased pressure (such as up to 5 MPa) in the presence of an appropriate amount of water and then at an atmospheric pressure and/or a reduced pressure.

The period of time required for the polymerization generally is 0.5 to 30 hours.

The polymerization can be carried out by a batch system or a continuous system.

In the polymerization for production of the polyetherpolyamide elastomer of the invention, one or more of appropriate additives can be employed for adjusting the molecular weight of the resulting elastomer or giving an elastomer which shows stable viscosity when the elastomer is molded or processed at an elevated temperature. Examples of the additives include monoamines and diamines such as laurylamine, stearylamine, hexamethylene diamine, and methaxylylene diamine, and monocarboxylic acids and dicarboxylic acids such as acetic acid, benzoic acid, stearic acid, adipic acid, sebacic acid, and dodeca diacid. These additives can be employed in such an amount to give a polymer having a relative viscosity of 1.2 to 3.5 (0.5 wt./vol. %, in m-cresol, 25° C.).

In the polymerization for production of the polyetherpolyamide elastomer of the invention, a catalyst can be employed, if desired. Examples of the catalysts include phosphoric acid, pyrophosphoric acid, polyphosphoric acid, phosphorous acid, hypophosphorous acid, and their alkali metal salts and their alkaline earth metal salts. Some of these inorganic phosphorus compounds can serve to impart heat resistance to the resulting polymer. The inorganic phosphorus compound can be employed in an amount of 50 to 3,000 ppm, based on the amount of a mixture of the starting compounds.

Other additives can be heat resistant agents, UV absorbers, anti-light stabilizers, oxidation inhibitors, anti-static agents, lubricants, anti-slipping agent, crystallizing nuclei, tackiness agents, sealing improvers, anti-foggants, releasing agents, plasticizers, pigments, dyes, perfume, flame retardant, and reinforcing materials.

The polyetherpolyamide elastomer of the invention can be molded by conventional molding methods such as injection molding, extrusion molding, blow molding, or vacuum molding.

The polyetherpolyamide elastomer of the invention can be advantageously employable for productions of articles which are used under severe conditions. For instance, the elastomer can be used for manufacture of sole of shoes to be used in base ball, football, athletics. The elastomer also can favorably be employed for manufacture of gears, connectors, and sealing materials to be employed in electronic-precision instruments, sheet materials and sealing materials to be employed in car industries.

The polyetherpolyamide elastomer of the invention can be molded in various forms such as sheets, films, tubes, hoses, and monofilaments. The elastomer also employed for manufacture of mirror boots of automobiles and uniform rate joint boots utilizing blow-molding.

The polyetherpolyamide elastomer of the invention can be easily bonded or blended to various resinous materials, particularly thermoplastic resin materials such as other polyamide resins, polyvinyl chloride, polyurethane, and ABS resins. The polyetherpolyamide elastomer of the invention can be favorably employed in combination of polyurethane resins to give a laminate comprising a sheet of the polyetherpolyamide elastomer and a sheet of polyurethane in which both sheets are bonded firmly to each other.

The present invention is further described by the following examples. In the examples, the physical properties are values which are determined by the following methods.

1) Relative viscosity ($\eta r$): Ostwald's viscometer is employed.

2) Terminal carboxyl concentration ([COOH]): Approx. 1 g of the polymer is placed in 40 mL of benzyl alcohol, which is then heated in an nitrogen gas atmosphere to dissolve the polymer in the alcohol. To the resulting polymer solution is added an indicator (phenolphthalein) and titrated using an N/20 potassium hydroxide-ethanol solution.

3) Terminal amino concentration ([$NH_2$]): Approx. 1 g of the polymer is dissolved in 40 mL of a mixture of phenol and methanol (9:1, volume ratio). To the resulting polymer solution is added an indicator (thimolblue) and titrated using an N/20 hydrochloric acid.

4) Number average molecular weight (Mn): calculated using the terminal carboxyl concentration ([COOH}) and the terminal amino concentration ([$NH_2$]) according the following equation:

$$Mn=2/([NH_2]+[COOH])$$

5) Melting temperature (Tm) and Crystallizing temperature (Tc): determined in a nitrogen gas atmosphere using a differential scanning calorimeter DSC-50 (available from Shimazu Seisakusho Co., Ltd.). The polymer is heated at a rate of 10° C./min., from room temperature to 230° C. (that is, first run temperature elevation), kept at 230° C. for 10 min. Subsequently, the temperature is decreased to −100° C. at a rate of 10° C./min. (that is, first run temperature decrease). Finally, the temperature is again increased to 230° C. at a rate of 10° C./min. (that is, second run temperature elevation). On the resulting DSC chart, Tc corresponds to an exothermic peak temperature in the first run temperature decrease, and Tm corresponds to an endothermic peak temperature in the second run temperature elevation.

6) Composition: determined in 4 wt. % heavy trifluoroacetic acid solution at room temperature using a proton NMR spectrum (JNM-EX 400 WB type FT-NMR, available from Japan Electron Co., Ltd.).

7) Stress relaxation: A dumbbell specimen cut out from an elastomer film sample (thickness: approx. 100 μm) in the form of JIS No. 3 dumbbell is placed between chucks (distance between chucks: 50 mm). The specimen is extended at 23° C. at a rate of 500 mm/min. When the extension reaches 0.4 mm (corresponds 2% of the straight portion of the dumbbell specimen), the extending operation is stopped, and the variation of stress is measured. The measurement is made to detect an initial stress ($\sigma_0$) at the time of 2% extension and further a stress at a lapse of t hours ($\sigma_t$). Then, a time ($t_{0.9}$) at which a ratio of $\sigma_t/\sigma_0$ reaches 0.9 is determined. A higher $t_{0.9}$ means lower stress relaxation and better elastomer characteristics.

8) Elastic recovery percentage of elongation: A dumbbell specimen cut out from an elastomer film sample (thickness: approx. 100 μm) in the form of JIS No. 3 dumbbell is placed between chucks (distance between chucks: 50 mm). The specimen is extended at 23° C. at a rate of 100 mm/min. Immediately when the extension reaches 4 mm (corresponds 20% of the straight portion of the dumbbell specimen), the extending operation is stopped, and the distance between the chucks is reduced at the same rate. A distance (r in terms of mm) between the chucks at which the stress reaches 0 is measured, and then calculation is made to determine the elastic recovery percentage of elongation using the following equation. A higher elastic recovery percentage of elongation means a better rubber elasticity.

$$\text{Elastic recovery percentage of elongation } (\%) = [4-(r-50)]/4 \times 100$$

[r: distance between the chucks (mm)]

9) Tensile properties: Strips (length 100 mm, width: 10 mm) cut out from an elastomer film (thickness: approx. 100 μm) is placed between the chucks (distance between chucks: 50 mm) and extended at 23° C. at a rate of 500 mm/min., to give breakage of the specimen. Based on thus obtained measurement data, a modulus of elasticity, a tensile strength at yield point, and a breaking elongation are determined.

10) Hardness: Shore D is measured at 23° C. in the manner defined in ASTM D2240. The elastomer is molded under pressure or by injection to give a sheet of 1 mm thick. The sheet is placed on a plate of Nylon 12 (UBENYLON 3030U, available from Ube Industries, Ltd.)

11) Haze (Degree of cloudiness): A sheet (70 mm×70 mm×1 mm thick) molded under pressure or by injection is subjected to measurement of haze in the manner as defined in JIS K7105. The direct reading haze computer HGM-2DP (available from Suga Testing Machine Co., Ltd.) is employed.

12) Water absorption: A sheet (50 mm×50 mm×3 mm thick) molded under pressure or by injection is placed in ion-exchanged water for 24 hours at 23° C. Then, the sheet is taken out of the water and the weight increase is measured.

EXAMPLE 1

In a reaction vessel (inner volume: approx. 130 mL) equipped with a stirrer, a nitrogen gas inlet, and a condensed water outlet were placed 21.1716 g of 12-aminododecanoic acid (PA12, available from Ube Industries, Ltd.), 8.2297 g of triblock polyetherdiamine (XTJ-542, available from Huntsman Corp., total amine: 1.95 meq/g, a compound of the formula (B), x=approx. 3, y=approx. 9, z=approx. 2), and 1.1414 g of adipic acid (AA). The gas inside of the vessel was fully replaced with nitrogen gas. Subsequently, the content of the vessel was heated to 190° C. for one hour in a stream of nitrogen gas at a rate of 50 mL/min. The temperature of the content was increased to 240° C. by gradually heating the content for a period of one hour, and then the polymerization was performed for 8 hours at 240° C., to give a polymer product.

The polymer product is white, tough polymer having good elasticity. ηr=1.88, [COOH]=2.65×10$^{-5}$ eq/g, [NH$_2$]=2.53×10$^{-5}$ eq/g, Mn=38,600, Tm=165° C., Tc=128° C., PA12/XTJ-542/AA=72.3/25.5/2.2 (wt. %).

The obtained polymer product was molded under pressure of 10 MPa at 230° C., to give a film (thickness: approx. 100 μm) and a sheet (thickness: approx. 1 mm). The film was used for the measurements of the elastic recovery percentage of elongation and tensile properties, and the sheet of 1 mm thick was used for the measurement of hardness. The results are set forth in Table 1.

EXAMPLE 2

In a reaction vessel (inner volume: approx. 130 mL) equipped with a stirrer, a nitrogen gas inlet, and a condensed water outlet were placed 15.0272 g of 12-aminododecanoic acid (PA12), 13.1944 g of triblock polyetherdiamine (XTJ-542), and 1.8237 g of adipic acid (AA). The gas inside of the vessel was fully replaced with nitrogen gas. Subsequently, the content of the vessel was heated to 190° C. for one hour in a stream of nitrogen gas at a rate of 50 mL/min The temperature of the content was increased to 238° C. by gradually heating the content for a period of one hour, and then the polymerization was performed for 8 hours at 238° C., to give a polymer product.

The polymer product is white, tough polymer having good elasticity. ηr=1.62, [COOH]=3.66×10$^{-5}$ eq/g, [NH$_2$]=4.14×10$^{-5}$ eq/g, Mn=25,600, Tm=151° C., Tc=108° C., PA12/XTJ-542/AA=50.7/44.2/5.1 (wt. %).

The obtained polymer product was molded under pressure of 10 MPa at 230° C., to give a film (thickness: approx. 100 μm) and a sheet (thickness: approx. 1 mm). The film was used for the measurements of the elastic recovery percentage of elongation and tensile properties, and the sheet of 1 mm thick was used for the measurement of hardness. The results are set forth in Table 1.

EXAMPLE 3

In a reaction vessel (inner volume: approx. 70 L) equipped with a stirrer, a thermometer, a torquemeter a pressure gauge, a nitrogen gas inlet, a pressure controller, and a polymer outlet were placed 17.500 kg of 12-aminododecanoic acid (PA12), 6.564 kg of triblock polyetherdiamine (XTJ-542), 0.936 kg of adipic acid (AA), and 0.125 kg of a heat resistant agent (Tominox 917, available from Yoshitomi Pharmaceutical Co., Ltd.). The gas inside of the vessel was fully replaced with nitrogen gas. Subsequently, the content of the vessel was heated to 240° C. for 3.5 hours at a pressure of 0.05 MPa in a stream of nitrogen gas at a rate of 300 L/min. The polymerization was carried out in the vessel at 240° C. for 2 hours keeping the pressure inside of the vessel at 0.05 MPa. Subsequently, the rate of nitrogen gas was decreased to 150 L/min., and the pressure inside of the vessel was decreased to 500 mmHg by means of a vacuum pump. Under the condition, the polymerization was again carried out at 240° C. for 5.5 hours. Subsequently after the polymerization was terminated, the stirring was stopped, and a molten colorless transparent polymer product was taken out of the vessel through the polymer outlet in the form of string. The polymer string was cooled in water and pelletized to give approx. 15 kg of pellets.

The polymer product is colorless, transparent, tough polymer having good elasticity. $\eta r=1.90$, $[COOH]=3.25\times10^{-5}$ eq/g, $[NH_2]=3.17\times10^{-5}$ eq/g, Mn=31,200, Tm=167° C., Tc=126° C.

The obtained polymer pellets were supplied to a biaxial extrude equipped with a coat-hanger type T die, and kneaded at 200° C. and extruded on a cooled roll (kept at 56° C.). The extruded product was then cooled on a roll (kept at 47° C.) to give a film having a thickness of approx. 100 μm. Further, a sheet (70 mm×70 mm, thickness 1 mm) was produced by injection molding. The film was used for the measurements of $t_{0.9}$, elastic recovery percentage of elongation and tensile properties, and the sheet of 1 mm thick was used for the measurement of hardness and haze. The results are set forth in Table 1.

EXAMPLE 4

In a reaction vessel (inner volume: approx. 70 L) equipped with a stirrer, a thermometer, a torquemeter a pressure gauge, a nitrogen gas inlet, a pressure controller, and a polymer outlet were placed 12.500 kg of 12-aminododecanoic acid (PA12), 10.940 kg of triblock polyetherdiamine (XTJ-542), 1.56 kg of adipic acid (AA), and 0.125 kg of a heat resistant agent (Tominox 917). The gas inside of the vessel was fully replaced with nitrogen gas. Subsequently, the content of the vessel was heated to 240° C. for 3 hours at a pressure of 0.05 MPa in a stream of nitrogen gas at a rate of 300 L/min. The polymerization was carried out in the vessel at 240° C. for 9.5 hours keeping the pressure inside of the vessel at 0.05 MPa. Subsequently after the polymerization was terminated, the stirring was stopped, and a molten colorless transparent polymer product was taken out of the vessel through the polymer outlet in the form of string. The polymer string was cooled in water and pelletized to give approx. 15 kg of pellets.

The polymer product is colorless, transparent, tough polymer having good elasticity. $\eta r=1.74$, $[COOH]=3.13\times10^{-5}$ eq/g, $[NH_2]=3.24\times10^{-5}$ eq/g, Mn=31,400, Tm=150° C., Tc=108° C.

The obtained polymer pellets were supplied to a biaxial extrude equipped with a coat-hanger type T die, and kneaded at 190° C. and extruded on a cooled roll (kept at 61° C.). The extruded product was then cooled on a roll (kept at 48° C.) to give a film having a thickness of approx. 100 μm. Further, a sheet (70 mm×70 mm, thickness 1 mm) was produced by injection molding. The film was used for the measurements of $t_{0.9}$, elastic recovery percentage of elongation and tensile properties, and the sheet of 1 mm thick was used for the measurement of hardness and haze. The results are set forth in Table 1.

EXAMPLE 5

In a reaction vessel (inner volume: approx. 70 L) equipped with a stirrer, a thermometer, a torquemeter a pressure gauge, a nitrogen gas inlet, a pressure controller, and a polymer outlet were placed 10.000 kg of 12-aminododecanoic acid (PA12), 13.129 kg of triblock polyetherdiamine (XTJ-542), and 1.871 kg of adipic acid (AA). The gas inside of the vessel was fully replaced with nitrogen gas. Subsequently, the content of the vessel was heated to 240° C. for 3 hours at a pressure of 0.05 MPa in a stream of nitrogen gas at a rate of 300 L/min. The polymerization was carried out in the vessel at 240° C. for 3 hours keeping the pressure inside of the vessel at 0.05 MPa. Subsequently, the rate of nitrogen gas was decreased to 150 L/min., and the pressure inside of the vessel was decreased to 500 mmHg by means of a vacuum pump. Under the condition, the polymerization was again carried out at 240° C. for 5.5 hours. Subsequently after the polymerization was terminated, the stirring was stopped, and a molten colorless transparent polymer product was taken out of the vessel through the polymer outlet in the form of string. The polymer string was cooled in water and pelletized to give approx. 16 kg of pellets.

The polymer product is pale yellow, transparent, tough polymer having good elasticity. $\eta r=1.65$, $[COOH]=5.13\times10^{-5}$ eq/g, $[NH_2]=5.33\times10^{-5}$ eq/g, Mn=19,100, Tm=137° C.

The obtained polymer pellets were supplied to a biaxial extrude equipped with a coat-hanger type T die, and kneaded at 200° C. and extruded on a cooled roll (kept at 50° C.). The extruded product was then cooled on a roll (kept at 38° C.) to give a film having a thickness of approx. 100 μm. Further, a sheet (70 mm×70 mm, thickness 1 mm) was produced by injection molding. The film was used for the measurements of $t_{0.9}$, elastic recovery percentage of elongation and tensile properties, and the sheet of 1 mm thick was used for the measurement of hardness and haze. The results are set forth in Table 1.

EXAMPLE 6

In a reaction vessel (inner volume: approx. 70 L) equipped with a stirrer, a thermometer, a torquemeter a pressure gauge, a nitrogen gas inlet, a pressure controller, and a polymer outlet were placed 14.000 kg of 12-aminododecanoic acid (PA12), 6.121 kg of triblock polyetherdiamine (XTJ-542), 0.879 kg of adipic acid (AA), 5.1 g of sodium hypophosphite, and 50.0 g of a heat resistant agent (Tominox 917). The gas inside of the vessel was fully replaced with nitrogen gas. Subsequently, the content of the vessel was heated to 230° C. for 3 hours in a stream of nitrogen gas at a rate of 300 L/min. The polymerization was carried out in the vessel at 230° C. for 6 hours. Subsequently after the polymerization was terminated, the stirring was stopped, and a molten colorless transparent polymer product was taken out of the vessel through the polymer outlet in the form of string. The polymer string was cooled in water and pelletized to give approx. 13 kg of pellets.

The polymer product is colorless, transparent, tough polymer having good elasticity. $\eta r=2.15$, $[COOH]=2.63\times10^{-5}$ eq/g, $[NH_2]=2.54\times10^{-5}$ eq/g, Mn=38,700, Tm=165° C., Tc=130° C.

The obtained polymer pellets were supplied to a biaxial extrude equipped with a coat-hanger type T die, and kneaded at 200° C. and extruded on a cooled roll (kept at 56° C.). The extruded product was then cooled on a roll (kept at 47° C.) to give a film having a thickness of approx. 100 μm. Further, a sheet (70 mm×70 mm, thickness 1 mm) was produced by injection molding. The film was used for the measurements of $t_{0.9}$, elastic recovery percentage of elongation and tensile properties, and the sheet of 1 mm thick was used for the measurement of hardness and haze. The results are set forth in Table 1.

EXAMPLE 7

In a reaction vessel (inner volume: approx. 70 L) equipped with a stirrer, a thermometer, a torquemeter a pressure gauge, a nitrogen gas inlet, a pressure controller, and a polymer outlet were placed 10.000 kg of 12-aminododecanoic acid (PA12), 8.752 kg of triblock polyetherdiamine (XTJ-542), 248 kg of adipic acid (AA), 20.2 g of sodium hypophosphite, and 50.0 g of a heat resistant agent (Tominox 917). The gas inside of the vessel was fully replaced with nitrogen gas. Subsequently, the content of the vessel was heated to 230° C. for 3 hours in a stream of nitrogen gas at a rate of 300 L/min. The polymerization was carried out in the vessel at 230° C. for 6 hours. Subsequently after the polymerization was terminated, the stirring was stopped, and a molten colorless transparent polymer product was taken out of the vessel through the polymer outlet in the form of string. The polymer string was cooled in water and pelletized to give approx. 13 kg of pellets.

The polymer product is colorless, transparent, tough polymer having good elasticity. ηr=2.13, [COOH]=2.33×10$^{-5}$ eq/g, [NH$_2$]=2.24×10$^{-5}$ eq/g, Mn=43,800, Tm=150° C., Tc=118° C.

The obtained polymer pellets were supplied to a biaxial extrude equipped with a coat-hanger type T die, and kneaded at 190° C. and extruded on a cooled roll (kept at 61° C.). The extruded product was then cooled on a roll (kept at 48° C.) to give a film having a thickness of approx. 100 μm. Further, a sheet (70 mm×70 mm, thickness 1 mm) was produced by injection molding. The film was used for the measurements of $t_{0.9}$, elastic recovery percentage of elongation and tensile properties, and the sheet of 1 mm thick was used for the measurement of hardness and haze. The results are set forth in Table 1.

COMPARISON EXAMPLE 1

In a reaction vessel (inner volume: approx. 130 mL) equipped with a stirrer, a nitrogen gas inlet, and a condensed water outlet were placed 21.1051 g of 12-aminododecanoic acid (PA12), 7.9417 g of bis(3-aminopropyl)-polytetrahydrofuran (mean molecular weight 1,100, available from ALDRICH Corp.), and 1.0536 g of adipic acid (AA). The gas inside of the vessel was fully replaced with nitrogen gas. Subsequently, the content of the vessel was heated to 190° C. for one hour in a stream of nitrogen gas at a rate of 50 mL/min. The temperature of the content was increased to 240° C. by gradually heating the content for a period of one hour, and then the polymerization was performed for 6 hours at 240° C., to give a polymer product.

The polymer product is pale yellow, tough polymer having good elasticity. ηr=1.91, [COOH]=3.02×10$^{-5}$ eq/g, [NH$_2$]=2.89×10$^{-5}$ eq/g, Mn=33,800, Tm=166° C., Tc=131° C.

The obtained polymer product was molded under pressure of 10 MPa at 230° C., to give a film (thickness: approx. 100 μm) and a sheet (thickness: approx. 1 mm). The film was used for the measurements of $t_{0.9}$, elastic recovery percentage of elongation and tensile properties, and the sheet of 1 mm thick was used for the measurement of hardness and haze. The results are set forth in Table 1.

COMPARISON EXAMPLE 2

In a reaction vessel (inner volume: approx. 130 mL) equipped with a stirrer, a nitrogen gas inlet, and a condensed water outlet were placed 15.0211 g of 12-aminododecanoic acid (PA12), 13.2405 g of bis(3-aminopropyl)-polytetrahydrofuran (mean molecular weight 1,100, available from ALDRICH Corp.), and 1.7588 g of adipic acid (AA). The gas inside of the vessel was fully replaced with nitrogen gas. Subsequently, the content of the vessel was heated to 190° C. for one hour in a stream of nitrogen gas at a rate of 50 mL/min. The temperature of the content was increased to 240° C. by gradually heating the content for a period of one hour, and then the polymerization was performed for 6 hours at 240° C., to give a polymer product.

The polymer product is pale yellow, tough polymer having good elasticity. ηr=1.81, [COOH]=3.10×10$^{-5}$ eq/g, [NH$_2$]=3.32×10$^{-5}$ eq/g, Mn=31,200, Tm=152° C., Tc=111° C.

The obtained polymer product was molded under pressure of 10 MPa at 230° C., to give a film (thickness: approx. 100 μm) and a sheet (thickness: approx. 1 mm). The film was used for the measurements of $t_{0.9}$, elastic recovery percentage of elongation and tensile properties, and the sheet of 1 mm thick was used for the measurement of hardness and haze. The results are set forth in Table 1.

COMPARISON EXAMPLE 3

In a reaction vessel (inner volume: approx. 130 mL) equipped with a stirrer, a nitrogen gas inlet, and a condensed water outlet were placed 12.0381 g of 12-aminododecanoic acid (PA12), 15.8805 g of bis(3-aminopropyl)-polytetrahydrofuran (mean molecular weight 1,100, available from ALDRICH Corp.), and 2.1096 g of adipic acid (AA). The gas inside of the vessel was fully replaced with nitrogen gas. Subsequently, the content of the vessel was heated to 190° C. for one hour in a stream of nitrogen gas at a rate of 50 mL/min. The temperature of the content was increased to 240° C. by gradually heating the content for a period of one hour, and then the polymerization was performed for 6 hours at 240° C., to give a polymer product.

The polymer product is pale yellow, tough polymer having good elasticity. ηr=1.72, [COOH]=3.46×10$^{-5}$ eq/g, [NH$_2$]=3.81×10$^{-5}$ eq/g, Mn=27,500, Tm=140° C., Tc=98° C.

The obtained polymer product was molded under pressure of 10 MPa at 230° C., to give a film (thickness: approx. 100 μm) and a sheet (thickness: approx. 1 mm). The film was used for the measurements of $t_{0.9}$, elastic recovery percentage of elongation and tensile properties, and the sheet of 1 mm thick was used for the measurement of hardness and haze. The results are set forth in Table 1.

TABLE 1

|        | 7)   | 8) | 9a) | 9b)  | 9c)  | 10) | 11) | 12)  |
|--------|------|----|-----|------|------|-----|-----|------|
| Ex. 1  | 3.5  | 89 | 170 | 13   | >600 | 62  | —   | 1.51 |
| Ex. 2  | 11   | 91 | 99  | 9.3  | >600 | 53  | —   | 1.60 |
| Ex. 3  | 3.9  | 88 | 180 | 14.5 | >600 | 63  | 29  | 1.50 |
| Ex. 4  | 12.1 | 91 | 100 | 9.3  | >600 | 53  | 13  | 1.70 |
| Ex. 5  | 13.5 | 93 | 61  | 6    | >600 | 44  | 11  | 2.15 |
| Ex. 6  | 3.1  | 89 | 185 | 13.5 | >600 | 63  | 29  | 1.52 |
| Ex. 7  | 12.2 | 92 | 108 | 9.6  | >600 | 54  | 12  | 1.50 |
| Com. 1 | 2.1  | 85 | 185 | 13   | >600 | 63  | 46  | 1.50 |
| Com. 2 | 8    | 88 | 102 | 9.5  | >600 | 54  | 27  | 1.55 |
| Com. 3 | 10.5 | 90 | 60  | 5.9  | >600 | 43  | 22  | 2.00 |

Remarks:
7) Stress relaxation ($t_{0.9}$) in terms of sec.
8) Elastic recovery percentage of elongation (%)
9a) Modulus of elasticity (MPa)
9b) Tensile strength at yield point (MPa)
9c) Breaking elongation (%)
10) Hardness (Shore D)
11) Haze
12) Water absorption (%)

The results set forth in Table 1 indicate that all of the elastomers are satisfactory in the modulus of elasticity, tensile strength at yield point, breaking elongation, hardness (Shore D), and water absorption. The stress relaxation ($t_{0.9}$), and elastic recovery percentage of elongation are also satisfactory in all of the elastomers. However, the following tendency is clear.

The elastomers of Examples 1, 3, and 6, and Comparison Example 1 have almost the same hardness (Shore D, 62 or 63). However, the elastomers of Examples 1, 3, and 6 are higher than the elastomer of Comparison Example 1 in both of the stress relaxation ($t_{0.9}$), and elastic recovery percentage of elongation.

The elastomers of Examples 2, 4, and 7, and Comparison Example 2 have almost the same hardness (Shore D, 53 or 64). However, the elastomers of Examples 2, 4, and 7 are higher than the elastomer of Comparison Example 2 in both of the stress relaxation ($t_{0.9}$), and elastic recovery percentage of elongation.

The elastomers of Example 5 and Comparison Example 3 have almost the same hardness (Shore D, 43 or 44). However, the elastomer of Example 5 is higher than the elastomer of Comparison Example 3 in both of the stress relaxation ($t_{0.9}$), and elastic recovery percentage of elongation.

COMPARISON EXAMPLE 4

In a reaction vessel (inner volume: approx. 130 mL) equipped with a stirrer, a nitrogen gas inlet, and a condensed water outlet were placed 15.0350 g of 12-aminododecanoic acid (PA12), 12.1535 g of triblock polyetherdiamine (XTJ-500, available from Huntsman Corp., total amine: 3.23 meq/g, a compound expressed by the formula (B) except for replacing the poly(butylene oxide) moiety with poly (ethylene oxide) moiety, x+z=3.6, y=9), and 2.8685 g of adipic acid (AA). The gas inside of the vessel was fully replaced with nitrogen gas. Subsequently, the content of the vessel was heated to 190° C. for one hour in a stream of nitrogen gas at a rate of 50 mL/min. The temperature of the content was increased to 238° C. by gradually heating the content for a period of one hour, and then the polymerization was performed for 10 hours at 238° C., to give a polymer product.

The polymer product is pale yellow, tough polymer having good elasticity. $\eta r=1.71$, $[COOH]=3.15 \times 10^{-5}$ eq/g, $[NH_2]=3.56 \times 10^{-5}$ eq/g, Mn=29,800, Tm=150° C., Tc=111° C.

The obtained polymer product was molded under pressure of 10 MPa at 230° C., to give a film (thickness: approx. 100 μm). The film was subjected to measurement of water absorption. The water absorption was so high as 107%.

COMPARISON EXAMPLE 5

In a reaction vessel (inner volume: approx. 130 mL) equipped with a stirrer, a nitrogen gas inlet, and a condensed water outlet were placed 15.0186 g of 12-aminododecanoic acid (PA12), 14.0131 g of triblock polyetherdiamine (XTJ-502, available from Huntsman Corp., total amine: 0.96 meq/g, a compound expressed by the formula (B) except for replacing the poly(butylene oxide) moiety with poly (ethylene oxide) moiety, x+z=6.0, y=38.7), and 0.9871 g of adipic acid (AA). The gas inside of the vessel was fully replaced with nitrogen gas. Subsequently, the content of the vessel was heated to 190° C. for one hour in a stream of nitrogen gas at a rate of 50 mL/min. The temperature of the content was increased to 230° C. by gradually heating the content for a period of one hour, and then the polymerization was performed for 10 hours at 230° C., to give a polymer product.

The polymer product is pale yellow, tough polymer having good elasticity. $\eta r=1.56$, $[COOH]=5.12 \times 10^{-5}$ eq/g, $[NH_2]=5.33 \times 10^{-5}$ eq/g, Mn=19,100, Tm=162° C., Tc=126° C.

The obtained polymer product was molded under pressure of 10 MPa at 230° C., to give a film (thickness: approx. 100 μm). The film was subjected to measurement of water absorption. The water absorption was so high as 121%.

EXAMPLE 8

In a reaction vessel (inner volume: approx. 130 mL) equipped with a stirrer, a nitrogen gas inlet, and a condensed water outlet were placed 17.9997 g of 12-aminododecanoic acid (PA12), 10.8743 g of triblock polyetherdiamine (XYX-1, total amine: 1.458 meq/g, a compound of the formula (B), x=approx. 3, y=approx. 14, z=approx. 2), 1.577 g of adipic acid (AA), and 0.0423 g of aqueous sodium hypophosphite solution (concentration: 35.55 wt. %). The gas inside of the vessel was fully replaced with nitrogen gas. Subsequently, the content of the vessel was heated to 180° C. under stirring (50 rpm) for one hour in a stream of nitrogen gas at a rate of 50 mL/min, for performing polymerization. The temperature of the content was then increased to 200° C. by gradually heating the content for a period of one hour, and then the polymerization was performed for one hour at 200° C. Further, the temperature was increased to 225° C., by gradually heating the content for a period of one hour, and the polymerization was performed for 8.5 hours, to give a polymer product.

The polymer product is white, tough polymer having good elasticity. $\eta r=2.33$, $[COOH]=3.64 \times 10^{-5}$ eq/g, $[NH_2]=2.55 \times 10^{-5}$ eq/g, Mn=32,300, Tm=160° C., Tc=126° C., PA12/XYX-1/AA=60.3/35.6/3.7 (wt. %).

The obtained polymer product was molded under pressure of 10 MPa at 230° C., to give a film (thickness: approx. 100 μm). The film was used for the measurements of the elastic recovery percentage of elongation and tensile properties. The results are set forth in Table 2.

EXAMPLE 9

In a reaction vessel (inner volume: approx. 130 mL) equipped with a stirrer, a nitrogen gas inlet, and a condensed water outlet were placed 15.0046 g of 12-aminododecanoic acid (PA12), 1.4448 g of adipic acid (AA), and 0.0482 g of aqueous sodium hypophosphite solution (concentration 35.55 wt. %). The gas inside of the vessel was fully replaced with nitrogen gas. Subsequently, the content of the vessel was heated to 180° C. under stirring (50 rpm) for one hour in a stream of nitrogen gas at a rate of 50 mL/min, for performing polymerization. The temperature of the content was then increased to 240° C. by gradually heating the content for a period of one hour, and then the polymerization was performed for 4 hours at 240° C., so as to prepare a prepolymer having a carboxyl group at both terminals. To the prepolymer was added 13.5732 g of the triblock polyetherdiamine (XYX-1). The gas inside of the vessel was then fully replaced with nitrogen gas, and the content of the vessel was heated to 185° C. under stirring (50 rpm) for one hour in a stream of nitrogen gas at a rate of 50 mL/min, for performing polymerization. Further, the temperature was increased to 225° C., by gradually heating the content for a period of one hour, and the polymerization was performed for 9.5 hours, to give a polymer product.

The polymer product is white, tough polymer having good elasticity. $\eta r=2.21$, $[COOH]=3.59 \times 10^{-5}$ eq/g, $[NH_2]=3.16 \times 10^{-5}$ eq/g, Mn=29,600, Tm=155° C., Tc=110° C., PA12/XYX-1/AA=49.3/45.2/5.5 (wt. %).

The obtained polymer product was molded under pressure of 10 MPa at 230° C., to give a film (thickness: approx. 100 μm). The film was used for the measurements of the elastic recovery percentage of elongation and tensile properties. The results are set forth in Table 2.

EXAMPLE 10

In a reaction vessel (inner volume: approx. 130 mL) equipped with a stirrer, a nitrogen gas inlet, and a condensed water outlet were placed 14.9972 g of 12-aminododecanoic acid (PA12), 13.9732 g of triblock polyetherdiamine (XYX- 2, total amine: 1.222 meq/g, a compound of the formula (B), x=approx. 5, y=approx. 14, z=approx. 4), 1.2480 g of adipic acid (AA), and 0.0467 g of aqueous sodium hypophosphite solution (concentration: 35.25 wt. %). The gas inside of the vessel was fully replaced with nitrogen gas. Subsequently, the content of the vessel was heated to 190° C. under stirring (50 rpm) for one hour in a stream of nitrogen gas at a rate of 50 mL/min, for performing polymerization. The temperature of the content was then increased to 230° C. by gradually heating the content for a period of one hour, and then the polymerization was performed for 12 hours at 230° C., to give a polymer product.

The polymer product is white, tough polymer having good elasticity. $\eta r=2.05$, $[COOH]=3.06\times10^{-5}$ eq/g, $[NH_2]=3.31\times10^{-5}$ eq/g, Mn=31,400, Tm=159° C., Tc=126° C., PA12/XYX-2/AA=49.3/46.5/4.2 (wt. %).

The obtained polymer product was molded under pressure of 10 MPa at 230° C., to give a film (thickness: approx. 100 $\mu$m). The film was used for the measurements of the elastic recovery percentage of elongation and tensile properties. The results are set forth in Table 2.

EXAMPLE 11

In a reaction vessel (inner volume: approx. 130 mL) equipped with a stirrer, a nitrogen gas inlet, and a condensed water outlet were placed 15.0020 g of 12-aminododecanoic acid (PA12), 13.8792 g of triblock polyetherdiamine (XYX-3, total amine: 1.105 meq/g, a compound of the formula (B), x=approx. 3, y=approx. 19, z=approx. 2), 1.1220 g of adipic acid (AA), and 0.0439 g of aqueous sodium hypophosphite solution (concentration: 35.25 wt. %). The gas inside of the vessel was fully replaced with nitrogen gas. Subsequently, the content of the vessel was heated to 190° C. under stirring (50 rpm) for one hour in a stream of nitrogen gas at a rate of 50 mL/min, for performing polymerization. The temperature of the content was then increased to 230° C. by gradually heating the content for a period of one hour, and then the polymerization was performed for 12 hours at 230° C., to give a polymer product.

The polymer product is white, tough polymer having good elasticity. $\eta r=1.87$, $[COOH]=5.44\times10^{-5}$ eq/g, $[NH_2]=4.13\times10^{-5}$ eq/g, Mn=20,900, Tm=161° C., Tc=122° C., PA12/XYX-3/AA=50.4/46.3/3.3 (wt. %).

The obtained polymer product was molded underexposure of 10 MPa at 230° C., to give a film (thickness: approx. 100 $\mu$m). The film was used for the measurements of the elastic recovery percentage of elongation and tensile properties. The results are set forth in Table 2.

TABLE 2

|        | 7)   | 8)   | 9a)  | 9b)  | 9d)  | 9c)  |
|--------|------|------|------|------|------|------|
| Ex. 8  | 7.2  | 88.0 | 111  | 9.8  | 42.1 | 710  |
| Ex. 9  | 15.1 | 89.2 | 76.1 | 7.5  | 38.1 | 910  |
| Ex. 10 | 11.5 | 88.8 | 81.9 | 7.9  | 36.2 | 870  |
| Ex. 11 | 5.5  | 88.5 | 88.5 | 7.4  | 36.4 | 860  |

Remarks:
7) Stress relaxation ($t_{0.9}$) in terns of sec.
8) Elastic recovery percentage of elongation (%)
9a) Modulus of elasticity (MPa)
9b) Tensile strength at yield point (MPa)
9c) Breaking elongation (%)
9d) Breaking strength (MPa)

The results set forth in Table 2 indicate that all of the elastomers are satisfactory in the required physical properties.

EXAMPLE 12

In a reaction vessel (inner volume: approx. 70 L) equipped with a stirrer, a thermometer, a torquemeter a pressure gauge, a nitrogen gas inlet, a pressure controller, and a polymer outlet were placed 12.00 kg of 12-aminododecanoic acid (PA12), 7.22 kg of triblock polyetherdiamine (XYX-1), 0.78 kg of adipic acid (AA), 0.01 kg of sodium hypophosphite, and 0.05 kg of an oxidation inhibitor (Tominox 917). The gas inside of the vessel was fully replaced with nitrogen gas. Subsequently, the content of the vessel was heated to 225° C. under stirring (20 rpm) for 3 hours in a stream of nitrogen gas at a rate of 300 L/min. The pressure inside of the vessel was adjusted to approx. 0.05 MPa from the time when the heating was started. Tee polymerization was carried out in the vessel at 225° C. for 6 hours. Then, the stirring was stopped, and a molten colorless transparent polymer product was taken out of the vessel through the polymer outlet in the form of string. The polymer string was cooled in water and pelletized to give approx. 14 kg of pellets.

The polymer product is white, tough polymer having good elasticity. $\eta r=2.25$, $[COOH]=3.47\times10^{-5}$ eq/g, $[NH_2]=2.01\times10^{-5}$ eq/g, Mn=36,500, Tm=160° C., Tc=105° C., PA12/XYX-1/AA=60.2/35.9/3.9 (wt. %).

The obtained polymer pellets were molded by injection molding, to give specimen for the following measurements. The results are described.

a) Tensile strength at yield point: 12 MPa
b) Breaking elongation: >300%
c) Bending strength: 8.5 MPa
d) Bending modulus of elasticity: 163 MPa
e) Impact strength (Izot, with notch, J/m): NB
f) Temperature of deflection under load: 76° C.
g) Hardness (Shore D): 56
h) Number of flexing operation to produce cracks: 1,000,000 times
i) Repulsive elasticity: 53%
j) Water absorption: 1.5%
k) Haze: 24%
l) Gloss: 105%
m) Yellowness Index: 3

The above-mentioned results indicate that the physical properties of the obtained elastomer is satisfactory.

EXAMPLE 13

In a reaction vessel (inner volume: approx. 5 L) equipped with a stirrer, a thermometer, a torquemeter a pressure gauge, a nitrogen gas inlet, a pressure controller, and a polymer outlet were placed 1400.01 kg of 12-aminododecanoic acid (PA12), 524.66 g of triblock polyetherdiamine (XTJ-542), 75.34 g of adipic acid (AA), 1.13 g of aqueous sodium hypophosphite solution (concentration: 35.55 wt. %), and 5.00 g of an oxidation inhibitor (Tominox 917). The gas inside of the vessel was fully replaced with nitrogen gas. Subsequently, the content of the vessel was gradually to 225° C. under stirring (50 rpm) for 4 hours in a stream of nitrogen gas at a rate of 500 L/min. The polymerization was carried out in the vessel at 225° C. for 10 hours. The stirring was stopped, and a molten colorless transparent polymer product was taken out of the vessel through the polymer outlet in the form of string. The polymer string was cooled in water and pelletized to give approx. 1.70 kg of pellets.

The obtained elastomer product is white, tough polymer having good elasticity. ηr=2.14, [COOH]=2.02×10$^{-5}$ eq/g, [NH$_2$]=1.78×10$^{-5}$ eq/g, Mn=53,000, Tm=163° C., Tc=118° C.

The physical properties of the obtained elastomer product are as follows:

Bending strength: 11.6 MPa
Bending modulus of elasticity; 214
Impact strength (J/m): NB
Repulsive elasticity: 48%
Hardness (Shore D): 63

1) The elastomer product was molded together with polyetherdiol-type polyurethane (Elastran ET890, hardness 90 (Shore A)) to give a two-layered article I.

2) The elastomer product was molded together with polyesterdiol-type polyurethane (Elastran ET690, hardness 90 (Shore A)) to give a two-layered article II.

3) The elastomer product was molded together with polyesterdiol-type polyurethane (Elastran ET195, hardness 95 (Shore A)) to give a two-layered article III.

The two-layered articles I, II, and III were subjected to measurements of peel strength and warpage in the following manners.

a) Peel strength: Polyurethane heated to 210° C. is molded by injection using a die heated to 40° C., to give a Y sheet (80 mm×80 mm, thickness 1 mm). In the die, the bottom of Y sheet is covered with aluminum metal film (80 mm×25 mm, thickness 15 μm). The elastomer product is heated to 240° C. and molded in a die (heated to 40° C.) to directly cover the polyurethane sheet. Thus, a two-layered composite article is produced. The composite article is cut in the longitudinal direction of the aluminum metal film to give strips (80 mm×10 mm, thickness: 2 mm). The strips are separated from the aluminum metal film to give specimens for the peel test. The sizes of the bonding area and grip area of the chucks of tester are 55 mm×10 mm and 25 mm×10 mm, respectively.

The peel test is carried out T peel mode by means of Tensilon 2500 (available from Orientech Corp.). The test is performed under the conditions of 5 mm for a space of chucks, and 20 mm/min. of tensile rate. The test is repeated five times, and their average data are adopted.

b) Warpage: A two-layered composite article of the elastomer and polyurethane (80 mm×80 mm×2 mm, 1 mm for the elastomer layer and 1 mm for the polyurethane layer) is placed on a horizontally set metal plate under such condition that the polyurethane layer faces the metal plate. Then, a clearance between the polyurethane layer and the metal plate is microscopically measured.

The two-layered composite article is prepared by injecting the elastomer (heated to 240° C.) into a die (heated to 40° C.) in which a polyurethane sheet which has been previously prepared by injecting the polyurethane (heated 210° C.) into the die (heated to 40° C.) is placed.

The results are set forth in Table 3

TABLE 3

| | Peel strength (kg · cm) | Warpage (mm) |
|---|---|---|
| Article I | 11.9 | 1.66 |
| Article II | 11.4 | 1.28 |
| Article III | 11.6 | 1.24 |

The results set forth in Table 3 indicate that all of the two-layered elastomer/polyurethane articles are satisfactory in their peel strength and tendency to produce curvature.

What is claimed is:

1. Polyetherpolyamide elastomer obtainable by polymerization of a polyamide-forming compound selected from the group consisting of an aminocarboxylic acid compound having the following formula (A1) and a lactam compound having the following formula (A2), a triblock polyetherdiamine compound having the following formula (B), and a dicarboxylic acid compound having the following formula (C):

$$H_2N—R^1—COOH \quad (A1)$$

$$\overset{\frown}{R^2—CONH} \quad (A2)$$

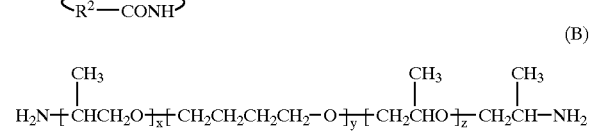

(B)

$$H_2N{+}CHCH_2O{+}_x{+}CH_2CH_2CH_2CH_2-O{+}_y{+}CH_2CHO{+}_z{-}CH_2CH-NH_2$$
(with CH$_3$ groups on the indicated carbons)

$$HOOC—(R^3)_m—COOH \quad (C)$$

in which each of R$^1$, R$^2$, and R$^3$ independently represents a liking group having a hydrocarbon chain therein, x is a value in the range of 1 to 20, y is a value in the range of 4 to 50, z is a value in the range of 1 to 20, and m is 0 or 1.

2. The polyetherpolyamide elastomer of claim 1, wherein the polyamide-forming compound is employed in an amount of 10 to 95 wt. %, based on total amount of the compounds (A1), (A2), (B) and (C).

3. The polyetherpolyamide elastomer of claim 1, wherein the polymerization is performed using 15 to 70 weight parts of the polyamide-forming compounds (A1) and/or (A2) and 30 to 85 weight parts of a combination of the compound (B) and compound (C) under the condition that the compounds (A1), (A2), (B) and (C) are used in an amount of 100 weight parts in total.

4. The polyetherpolyamide elastomer of claim 1, wherein wherein R$^1$ of the formula (A1) comprises an alkylene group having 2 to 20 carbon atoms.

5. The polyetherpolyamide elastomer of claim 1, wherein R$^2$ of the formula (A2) comprises an alkylene group having 3 to 20 carbon atoms.

6. The polyetherpolyamide elastomer of claim 1, wherein x of the formula (B) is a value in the range of 2 to 6, y is a value in the range of 6 to 12, z is a value in the range of 1 to 5.

7. The polyetherpolyamide elastomer of claim 1, wherein x of the formula (B) is a value in the range of 2 to 10, y is a value in the range of 13 to 28, z is a value in the range of 1 to 9.

8. The polyetherpolyamide elastomer of claim 1, wherein the dicarboxylic acid compound of the formula (C) is an aliphatic dicarboxylic acid or an alicyclic dicarboxylic acid.

9. The polyetherpolyamide elastomer of claim 1, wherein R$^3$ of the formula (C) comprises an alkylene group having 1 to 20 carbon atoms.

10. A composite structure comprising a sheet of polyetherpolyamide elastomer of claim 1 and a polyurethane sheet bonded to the elastomer sheet.

11. The composite structure of claim 10, wherein the polyurethane sheet is a thermoplastic polyurethane sheet.

12. The composite structure of claim 11, wherein the thermoplastic polyurethane comprises a soft segment polyesterdiol and/or polyetherdiol.

* * * * *